United States Patent

[11] 3,548,094

[72] Inventor Herbert N. Schlein
Beverly, Mass.

[21] Appl. No. 653,910
[22] Filed July 17, 1967
[45] Patented Dec. 15, 1970

[73] Assignee Rahn Corporation
Waltham, Mass.
a corporation of Massachusetts

[54] PIP FACSIMILE SYSTEM
8 Claims, 5 Drawing Figs.

[52] U.S. Cl. .......... 178/6.6, 178/6, 346/74
[51] Int. Cl. .......... H04n 5/80
[50] Field of Search .......... 178/6.6A; 346/74ES, 74ESX; 96/1(Inquired); 250/49.5(Inquired)

[56] References Cited

UNITED STATES PATENTS

| | | | |
|---|---|---|---|
| 3,005,707 | 10/1961 | Kallmann et al. | 96/1 |
| 3,008,794 | 11/1961 | Schroter | 346/74 |
| 3,308,233 | 3/1967 | Button et al. | 178/6.6 |
| 3,355,288 | 11/1967 | Matkan | 96/1 |
| 3,406,060 | 10/1968 | Schlein | 96/1 |

OTHER REFERENCES

" Data Storage and Display with Polarized Phosphors" Article in Electronics, Aug. 28, 1959, pp 39— 41.

" Persistent Internal Polarization" Article in Physical Review, Vol. 97, No. 6, Mar. 15, 1955, pp. 1596— 1610.

*Primary Examiner*—Robert L. Griffin
*Assistant Examiner*—Richard K. Eckert, Jr.
*Attorney*—Burns, Doane, Benedict, Swecker and Mathis

ABSTRACT: A high speed facsimile system for converting electrical signals received from a facsimile transmitter into a visible image on a variety of substances. The electrical signals are converted into and stored as a latent image through the use of the phenomenon of persistent internal polarization, from which latent image multiple visible copies may be produced.

INVENTOR
HERBERT N. SCHLEIN

*INVENTOR*
HERBERT N. SCHLEIN

INVENTOR
HERBERT N. SCHLEIN

PIP FACSIMILE SYSTEM

FIELD OF THE INVENTION

The present invention relates to facsimile systems, and more particularly to an improved facsimile system receiver for reproducing images corresponding to electrical signals emitted by a facsimile system transmitter.

DISCUSSION OF THE PRIOR ART

Since the reduction to practice of an operable facsimile system over a century ago, a plethora of different facsimile system receivers had been assayed and found wanting. Receivers of the type utilizing a photographic system require complex and often costly apparatus such as high speed optical scanners, high speed photographic plates and separate developing baths, all to produce a damp or even wet copy. Receivers of the type utilizing electrically activated styli to contact and burn or cause chemical reactions in pretreated copy paper produce copy having an uneven image density resulting from the unavoidable variations in the contact pressure between the relatively sharp stylus and irregular surface of the copy paper, unsightly abrasion of the copy paper surface by the engaging stylus, and fuzz about the image on the copy paper resulting from the eventual accumulation of insulating or conducting particles on or about the stylus point. Receivers of the type operating on xerographic principles require such high voltages as to present a safety hazard and are furthermore characterized by an inherent, extreme sensitivity to variations in ambient temperature and humidity conditions.

A primary criterion of the consumer desirability of a particular facsimile system receiver is the speed with which it can convert the electrical signals received from the transmitter into a visible image on the copy paper; that is, its copying speed. The copying speed of an electromechanical receiver using an electrically actuated stylus is limited by the considerable length of time during which the actuated stylus must be in contact with a particular incremental area of the copy paper in order to cause therein the desired burning or chemical reaction, before it can contact the next incremental area of the copy paper. Similarly, the copying speed of a receiver operating on xerographic principles is limited by the also considerable length of time during which the uniformly electrostatically charged photoconductive drum must be exposed to an impinging light image before a latent image is produced on the drum surface by the discharge of electrostatic charges in the impinged areas corresponding to the image. In the case of the xerographic receivers, the slow copying speed problem is compounded by the subsequent rapid decay rate of the electrostatic differential constituting the latent electrostatic image. On the one hand, the latent image must be transferred and used to create a visible image on the copy paper almost immediately after its impressment on the drum in order to obtain dark, well resolved copy; on the other hand, the aforementioned slow copying speed of the receiver limits the extent to which the time gap between the image impressment and transfer operations may be reduced.

A further disadvantage of facsimile systems known to date is that the transmitter must convert the image to be copied into an electrical signal for transmission to the receiver at the same rate that the receiver converts the electrical signals received from the transmitter into a visible image. Obvious important applications await the development of a facsimile system having a transmitter which can scan a visible image and produce the electrical signals representing the image at one rate, and a receiver which can receive the electrical signals from the transmitter, temporarily store them as necessary, and produce a visible image corresponding to the received electrical signals at another rate.

SUMMARY OF THE INVENTION

The use of materials exhibiting the phenomena known as "-persistent internal polarization" (hereinafter called "PIP") as a latent image storage mechanism for office copies has been the subject of several patent applications, including Pat. applications Ser. No. 445,910 filed Apr. 6, 1965; Ser. No. 534,697 filed Mar. 16, 1966; and Ser. No. 590,261 filed Oct. 28, 1966 (hereinafter referred to as the "basic applications"). Basically these PIP copying machines use as a latent image storage means a dispersion of certain photoconductive insulators in selected dielectric media. A persistent internal polarization pattern corresponding to the image to be copied is created in the storage means by placing the loaded dielectric in a uniform unidirectional electrical field shortly before its exposure to a pattern of radiation and nonradiation corresponding to the image to be copied. The latent image is later developed by using toners which are fully described in the basic applications.

The PIP facsimile receiver of the present invention utilizes a similar latent image storage means, but impresses the latent image upon the storage means, in one embodiment, by applying to the loaded dielectric a unidirectional electrical field proportional to a varying electrical signal during or shortly after exposure of the storage means to a uniform pattern of radiation and, in another embodiment, by applying to the loaded dielectric a uniform unidirectional electrical field during or shortly after exposure of the storage means to a pattern of radiation corresponding to the varying electrical signal. In either case, the latent image is later developed, for example by using a liquid toner.

Accordingly, it is an object of the present invention to provide a high speed facsimile system receiver of a relatively simple and economical design wherein the electrical signals received from a facsimile system transmitter are converted into a visible image on ordinary or dry copy paper by means of a stylus which does not engage the surface of the copy paper and which operates without burning or causing a chemical reaction in the copy paper.

A further object is to provide a facsimile system which is operable on low voltages, is substantially insensitive to ambient temperature and humidity variations, and is not subject to a copying speed limitation imposed by an electrostatic discharge rate.

Still another object is to provide a facsimile system wherein the transmitter can produce electrical signals representing the image to be copied at a rate different from that at which the receiver produces a visible image corresponding to the transmitted electrical signals.

BRIEF DESCRIPTION OF THE DRAWING

Briefly, the objects and purposes of the present invention will become apparent from the following description when read in conjunction with the accompanying drawings wherein.

DESCRIPTION OF THE PREFERRED EMBODIMENTS S

Figure 1:
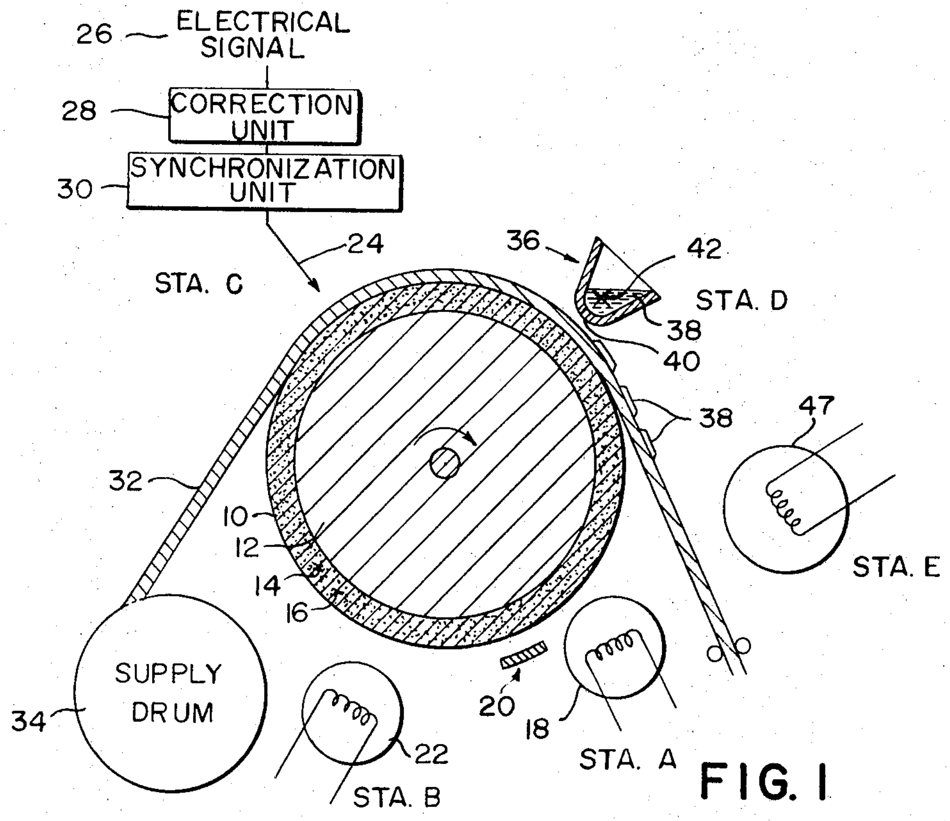
FIG. 1 is a schematic cross-sectional view of a preferred "-direct process" embodiment of a PIP facsimile system receiver of the present invention.

Throughout the several figures of the drawing, like reference numbers will be used to designate like components. While for purposes of clarity, the embodiments have been represented schematically in the drawing, the structural details of these embodiments can readily be supplied by the utilization of prior art techniques.

With reference now to the drawing and more particularly to FIG. 1 thereof, there is shown in schematic form a PIP facsimile system receiver of the type wherein toner is applied directly to the surface of the copy paper, hereinafter called a "direct process" embodiment. In the specific preferred direct process embodiment illustrated in FIG. 1, the latent image storage means comprises a layer 10 of material exhibiting the phenomenon known as PIP secured about the circumference of a large rotatable conductive drum 12. The PIP material 10 is composed of photoconductive insulator particles 14 dispersed in a matrix 16 having a volume resistivity greater than $10^9$ ohm-centimeter. Suitable photoconductive insulators include activated zinc cadmium sulfide phosphors, alkali halides, anthracene, chrysene, and other inorganic or organic photoconductors which exhibit a high resistance when not illuminated. Among the materials found particularly suitable for use as a dielectric for suspension of the photoconductive insulator particles are cellulose nitrate, cellulose acetate, polyvinyl acetate, acrylonitrile-butadiene-styrene terpolymers, cyclicized rubbers, styrenated alkyds and similar essentially nonphotopolarizable materials having a volume resistivity greater than $10^9$ ohm-cm.

In order to produce the PIP medium, a photoconductive insulator, such as zinc cadmium sulfide (*Zn:Cd*)S, and a binder, such as polyvinyl chloride-acrylonitrile, are selected and from 2 to 24 parts of the insulator are dispersed in 1 part of the binder by well known methods, preferred PIP mediums containing a weight ratio of 16 parts photoconductive insulator to 1 part binder. The dispersion may be deposited on the drum by any convenient means, preferably in a layer 0.05 to 0.5 mm. in thickness.

A preferred method of placing the PIP medium 10 in condition for receiving an image is shown at Station A of FIG. 1. It may be noted that other methods are available and, in fact, Station A may be dispensed with entirely except where the highest degrees of resolution and image contrast are essential. Station A comprises means for uniformly irradiating the PIP medium as it passes by the station and applying to it a uniform unidirectional electrical field during or shortly after irradiation. As indicated in FIG. 1, irradiation is effected by a light source 18 and the uniform unidirectional electrical field is effected by a power supply (not shown) connecting the conductive drum 12 and a conductive member 20, the latter being slightly displaced from the surface of the PIP medium 10 to minimize wear therebetween. While the embodiment shown in FIG. 1 utilizes a sequential technique, wherein the electrical field is applied subsequent to the irradiation, a concurrent technique, wherein the electrical field is applied concurrently with the irradiation, may also be utilized, for example, by replacing Station A with a NESA tube comprising a tubular light source coated with a thin transparent conductive coating. In either case, in order to prevent irradiation from the light source from impinging upon segments of the PIP medium not then directly passing through Station A, opaque baffles (not shown) may be placed around the light source as necessary.

When irradiation from the light source 18 passes into the body of the PIP medium 10, free charges, such as electrons and holes, are generated in the medium by the absorption of photons. Since the generated charges are more free to move when the body is irradiated, the ability of these charges to move will hereafter be referred to as their "photomobility". These photomobile charges migrate to a barrier or trap under the influence of the applied uniform electrical field of the conductive member 20, the electrons drifting towards the positive electrode and the holes drifting towards the negative electrode. When the light is shut off, the photomobility rapidly decays and, despite the coulombic attraction of the oppositely charged holes and electrons, most of these charges remain trapped. This trapping of the free charges, known as PIP, causes the body to become electrically polarized with a net field being observable at the surface of the body.

Although the trapped charges will, through thermal effects, eventually recombine, the average polarization half-life of the PIP material as described is about 4 hours and half-lives of nearly 2000 hours have been recorded. Since the matrix 16 in conjunction with the photoconductive insulator particles 14 must prevent the recombination of the created free charges for prolonged periods, it must have the property of retaining the charges in separation or, in other words, prevent the recombination.

Once the segment of the PIP medium 10 underlying Station A has been uniformly polarized, revolution of the drum 12 carries this segment to station B for further irradiation.

Station B comprises a light source 22 similar to the light source 18 at Station A, and, if desired, may also be suitably baffled to ensure that the uniform radiation emanating therefrom will impinge only upon the segment of the PIP medium 10 directly passing thereunder. The effect of Station B upon this PIP medium segment is to recreate "photomobility" within the uniformly polarized PIP medium segment so that the photomobile free charges therein will be able to migrate under the influence of the electrical field to be applied thereto at Station C.

It is at Station C that the desired image is impressed upon the PIP medium. Accordingly, Station C must be located shortly after Station B so that the "photomobility" of the free charges created in Station B does not have an opportunity to significantly decay before the application of the electrical field to these charges at Station C.

Station C is comprised of one or more conductive members 24 connected to the conductive drum 12 through a power supply (not shown) which produces an electrical field proportional to the electrical signals transmitted by the facsimile system transmitter. As indicated in FIG. 1, the electrical signal 26 received from the facsimile system transmitter passes through a correction unit 28 which may demodulate, amplify, decode, rectify or otherwise correct the signal as desired to provide the appropriate voltage differential at Station C. While the segment of the PIP medium passing through Station C is being internally polarized by the application of an electrical field, rather than being physically or chemically changed by means of a physically engaging stylus as in the prior art techniques, techniques for causing the entire width of the PIP medium to be scanned by the electrical field may be easily adapted from such prior art techniques using either styli or helix-type recorders. For example, the conductive stylus 24 of Station C may be controlled by a synchronization unit 30 which causes the stylus 24 to sweep across the width of the PIP medium between intermittent rotation of the PIP medium. Alternatively, a plurality of styli may be provided across the width of the PIP medium, each responsive to a corresponding electrical signal emitted by the facsimile system transmitter (in which case rotation of the drum and PIP medium may be continuous and smooth). In yet another alternative, the stylus may take the form of a metal spiral or helix, extending across the width of the PIP medium, mounted on the surface of a cylinder rotating synchronously with the transmitting scanner so that the point of intersection between the drum and helix moves along the width of the drum in unison with the transmitter scanning motion, with each signal increment passing to the drum through the medium at the proper point.

Further rotation of the drum carries the PIP medium segment, containing the persistent internal polarization pattern corresponding to the transmitted image, to Station D. At some point prior to introduction of the PIP material segment to Station D, a segment of an insulative carrier 32 is placed over this segment of the PIP medium layer 10. As indicated in FIG. 1, this insulative carrier 32 is drawn from a supply drum 34 and applied to the PIP medium surface at a point between stations B and C; however, in other embodiments of the present invention, the insulative carrier 32 may be applied between Stations A and B, C and D, or even prior to Station A. In fact, as will later be described in connection with FIG. 2, the insulative carrier may constitute a film permanently overlying the PIP material with provisions being made for a toner transfer step involving the removal of the toner therefrom onto a material suitable for permanent retention of the toner. Whenever the insulative carrier is to be applied to the PIP medium at a point prior to Station B, an additional requirement of radiation transparency is imposed upon the material used as the insulative carrier; to wit, the carrier must be transparent to radiation in order to allow the radiation applied at Station B or Stations A and B to pass therethrough and impinge upon the PIP medium.

As indicated in FIG. 1, it is preferred that the irradiation applied to the PIP medium segment by the light source 22 at Station B terminate prior to the application of the electrical field to the PIP medium segment by the conductive member 24 at Station C. It is possible, however, to combine Stations B and C into a single station composed for example of an illuminating stylus, with only a minor sacrifice in image resolution. During read in the stylus illumination would, of course, remain constant in magnitude while the stylus electrical field varied in response to the electrical signals received. In any case, the photomobile free charges in the illuminated PIP medium migrate under the influence of the selectively applied electrical field to form a latent image corresponding to the electrical signal received.

Following the impression of an image on the PIP material segment at Station C, the carrier-bearing drum revolves to move the PIP medium segment and overlying insulative carrier segment to Station D where there is provided means for depositing toner on the surface of the carrier segment. Basically Station D comprises a trough-shaped hopper 36 suspended over the entire width of the PIP medium 10. Toner 38 disposed in the trough is dispensed from the hopper 36 through openings 40 provided in the bottom thereof, a revolving paddle wheel 42 being disposed in the trough to ensure that the toner 38 is evenly dispensed and sifted over the entire width of the carrier 32.

Toners 38 suitable for use at this Station D are well known and may be readily purchased as either solid fusible toners or suspended liquid toners. Suitable liquid toners include carbon black suspended in organic liquid such as kerosene, petroleum ether or freon, while suitable solid toners include a powder of nigrosine dye impregnated polystyrene, mixed with iron powder as a carrier. In order that the toner will be selectively attracted to portions of the carrier segment overlying areas of the PIP medium segment having a predetermined polarity, it is necessary that the toner be capable of acquiring a small static charge of the opposite polarity by the tribolectric effect.

Once the toner 38 is resting on the surface of the carrier segment 32, the carrier segment 32 may be removed from the PIP medium segment 10 as the toner 38 will tend to remain in place unless disturbed. The carrier segment 32 may, for example, be removed from the PIP medium segment 10 and passed through Station E wherein a heating element 47 is provided for one of several purposes according to the nature of the toner 38 on the surface of the insulative carrier 32. In the case of liquid toners, the heating element 47 would hasten the drying process; in the case of suspended toners, the heating element 47 would evaporate and drive off the suspending agent; and in the case of fusible toners, the heating element 47 would fuse the toner onto the carrier surface for permanent retention thereby.

Figure 2:
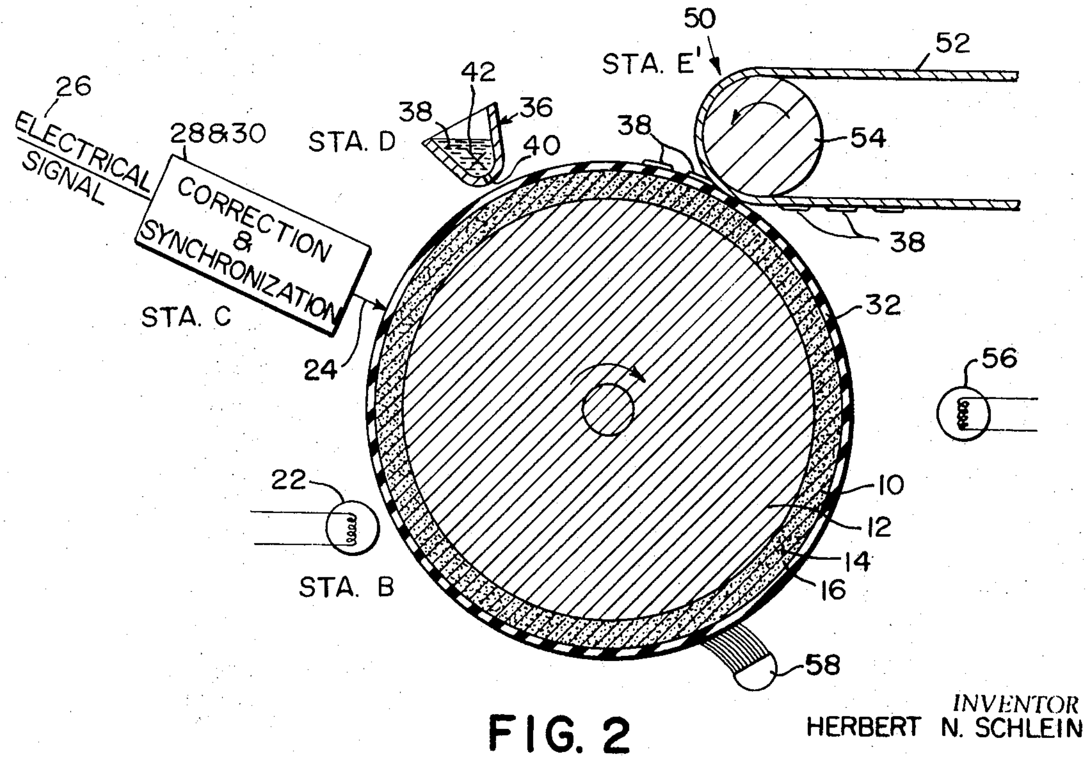
FIG. 2 is a schematic cross-sectional view of a preferred "indirect process" embodiment thereof.

Referring now to FIG. 2, there is shown in schematic form a preferred "indirect process" embodiment wherein the entire exposed circumferential surface of the PIP medium 10 is covered by a layer of the insulative carrier 32 for rotation therewith. As the irradiations of Station B will necessarily have to pass through the insulative carrier 32 in order to reach the PIP medium, it is essential that the insulative carrier 32 of this embodiment be radiation transparent. Stations B, C and D of this embodiment are identical with those of the "direct process" embodiment of FIG. 1, the primary differences in stations being found in the absence of Station A and in Station E′ wherein there is found a toner transfer means 50 rather than a heating element 47. The absence of Station A is a matter of choice, and it may be included or not as desired. As with the "direct process" embodiment the recording stylus 24 and drum 12 of the "indirect process" embodiment operate as slaves to the scanning stylus and drum of the facsimile system transmitter.

Referring now in particular to FIG. 2, following deposition of toner 38 on the insulative carrier segment 32 at Station D, further revolution of the drum 12 presents the carrier segment 32 to the toner transfer means 50 of Station E′ where the toner 38 is transferred to a suitable medium such as a paper sheet 52. In order to insure satisfactory contact between the toner 38 and sheet 52, a roller 54 may be positioned behind the sheet 52 to press the sheet 52 tightly against the exposed toner-bearing surface of the carrier segment 32. In other embodiments, however, it is also possible to use small guiding rollers to guide the paper into contact with the exposed toner-bearing carrier segment surface. In order to insure that the toner 38 is picked up by the surface of the paper sheet 52, it is preferable that a voltage differential be provided by a power supply (not shown) between the drum 12 and roller 54 or, in the other embodiments mentioned, between the drum and a conductive member slightly displaced from the rear of the paper when the paper face is in contact with the PIP medium. Following the transfer of toner 38 from carrier 32 to paper 52, the toner 38 may be fixed on the paper 52 in a separate process well known to the art, such as the fusion of fusible toners, by means such as those indicated at Station E of FIG. 1.

It has been found that almost complete transfer of the toner to the paper can be achieved with voltage differentials on the order of 1.5 kilovolts, using a paper having a machine calendared finish coated to a thickness of about 2 pounds per 3000 square feet with a well-known polymer such as polyvinyl acetate emulsion. It has further been found that other materials such as polyacrylate emulsion and acyclic rubber can be used as a coating and that, when such a coating is used, little or no additional treatment of the paper is necessary in order to fix the toner thereto.

If desired, additional elements may be provided between Stations E′ and A so that during the passage of the carrier segment from Station E′ to Station A, the initial starting point of the cycle, residual toner may be removed from the surface of the carrier segment. For example, the PIP medium segment 10 may be flooded with radiation, from a source 56 such as a photoflood or infrared lamp, to once again cause the free charges to become photomobile and, in this instance, recombine as no field is imposed on the charges. Thereafter cleaning means, such as a brush 58 positioned so as to remove any residue of the toner adhering to the carrier segment after its passage through Station E′, may be used to sweep residual toner from the carrier. It will be noted that at this point the toner 38 is no longer actively held on the surface of the carrier segment 32 because the underlying polarization of the PIP medium 10 has been discharged by passage through the irradiating means 56. After passage of the carrier segment 32 through the cleaning means 58, it is again presented to Station A and the cycle previously described repeated.

It should be noted that the response of the free charges of the irradiated PIP medium to an electrical field, such as that applied at Stations A and C, is on the order of one microsecond while the dark decay rate of the latent image stored in the PIP medium is on the order of at least a 4 hour half-life. Accordingly, even under humid conditions, the copying rate of the PIP facsimile receiver is generally dependent not upon the decay rate of the impressed image, but upon the rate of image impressment. As the maximum feasible image impressment rates for PIP materials—the polarization rate—is considerably greater than the image impressment rate for electrostatic materials—the electrostatic discharge rate—overall copying speed of a PIP facsimile system receiver is faster than that of a xerographic facsimile system receiver. Furthermore, as the responsiveness of an illuminated PIP medium to the electrical field applied is independent of the ambient temperature and humidity conditions, the PIP facsimile system receiver is especially adapted for use in areas and regions where electrostatic-type receivers would be unsatisfactory. Also, as the stylus of a PIP facsimile system receiver need never be in physical contact with the PIP medium or the insulative carrier, it never abrades the surfaces thereof nor accumulates stray particles about its point.

Yet another embodiment of the present invention, called the "flash-out" embodiment, has as its characteristic feature the use of an electroluminescent PIP medium and, as opposed to the embodiments shown in FIGS. 1 and 2, requires replacement of the toning Station D and subsequent stations by a flash-out Station D'.

Figure 3:
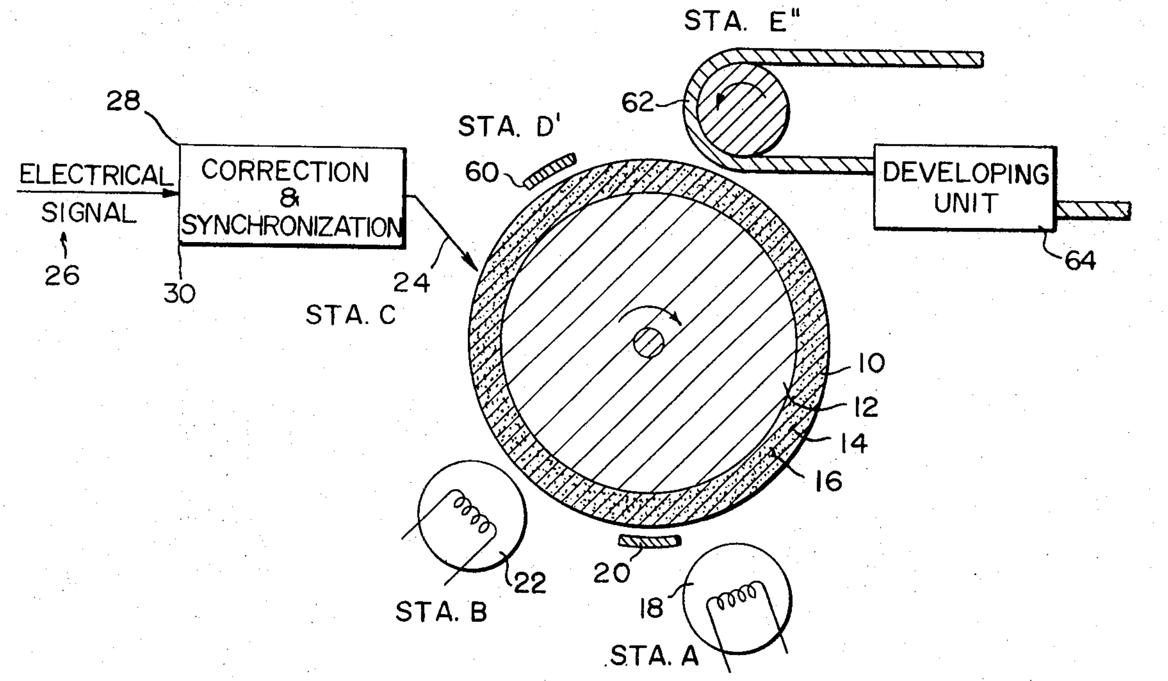
FIG. 3 is a schematic cross-sectional view of a preferred "line flash out" embodiment thereof.
Figure 4:
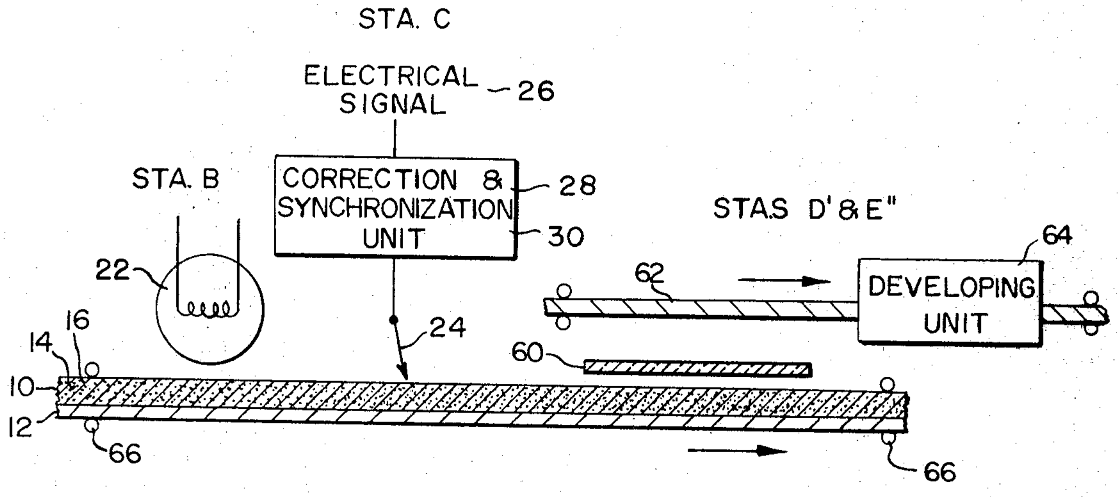
FIG. 4 is a schematic cross-sectional view of a preferred "page flash out" embodiment thereof.

Referring now to FIGS. 3 and 4, there is shown in schematic form preferred "flash-out" embodiments wherein the layer 10 of the PIP medium comprises an electroluminescent PIP material, such as powdered phosphor, in a transparent binder, such as castor wax or tricersyl phosphate. The segment of each PIP medium shown at Station D' has already been uniformly polarized at Station A by the light source 18 and conductive member 20, uniformly irradiated at Station B by the irradiation source 22, and selectively internally polarized at Station C by the varying unidirectional electrical field of the stylus 24. At Station D', the latent image produced in the PIP medium by its passage through Station C is made visible either line by line, as in the "line flash-out" embodiment shown in FIG. 3, or page by page, as in the "page flash-out" embodiment shown in FIG. 4, as desired.

Referring now in particular to FIG. 3, at Station D' the length of PIP medium just passing a conductive member 60 is made to electroluminesce, according to the process described in U.S. Pat. No. 3,235,850, by a unidirectional power supply (not shown) connected to the conductive member 60 and the drum 12 and having a polarity opposite that impressed on selected areas of the PIP medium at Station C. The flash of electroluminescence may be contained by suitably arranged baffles (not shown) and directed toward developable photosensitive material, such as a photographic film 62 at Station E", the advancement of which is synchronized with the advancement of the PIP medium 10, and therefore with rotation of the drum. The film 62 may be positioned to one side of the conductive member 60, as illustrated in FIG. 3 or, if the conductive member 60 is suitably transparent, totally or partially behind the conductive member 60, as illustrated in FIG. 4. The chemical reaction of the film 62 responsive to the electroluminescent flash of the PIP medium will record the flashed-out image of the line or page for later development by techniques well known to those skilled in the photographic arts; for example, an "on line" developing unit 64.

As the time gap between image impressment and image readout is of only minor importance in a PIP facsimile system, image readout may be delayed until a group or entire page of lines are in position to be recorded upon flash-out. By way of contrast, it is noted that conventional electrostatic facsimile system receivers, because of their inherently rapid electrostatic charge decay rate, cannot operate as page-by-page embodiments.

In a "page flash-out" or "page readout" embodiment, provision should preferably be made to compensate for the curvature of the PIP medium layer 10 bearing the latent image. Compensation may be provided, for example, by a lens adapted to correct for the curvature or by giving the photographic paper or toner receiver medium a curvature parallel to that of the PIP medium. More simply, substantial compensation may be provided by using a PIP medium-bearing drum 12 of such a large diameter that the curvature of the circumferential length thereof equal to one page is negligible. Full compensation may be conveniently provided by using the fourth embodiment of the present invention, as indicated in FIG. 4.

Referring now in particular to FIG. 4, there is shown in schematic form a preferred "page flash-out" embodiment wherein the drum 12 and the PIP medium 10 of the "line flash-out" embodiment has been formed in a planar rather than an arcuate shape, and the stations correspondingly rearranged. The PIP medium 10 is supported on the conductive backing 12, the combination of PIP medium 10 and conductive backing 12 being driven by rollers 66 linearly from left to right as shown in FIG. 4. PIP medium 10 is transported past Station B where it is irradiated by a light source 22, past Station C where a power supply (not shown) connected to the stylus 24 and conductive backing 12 creates a varying unidirectional electrical field to form a responsive latent image in the irradiated PIP medium 10, and finally past Stations D' and E". At this point a unidirectional power supply (not shown) of constant magnitude and a polarity opposite to that of the power supply of Station C is connected to the conductive member 60 and the conductive backing 12. The resultant electrical field causes the latent image to be flashed-out of the PIP medium and picked up by the overhead photographic film 62. The PIP medium 10, if sufficiently flexible, may then be returned to Station B, either directly or after erasure of any remnant of the latent image by mechanisms such as those shown in FIG. 2. Especially if the characteristic speed of the photographic film is low, it is preferred that parallel motion of the photographic film 62 and PIP medium layer 10 in the direction of travel be synchronized and follow an intermittent pattern so that both photographic film and PIP medium are stationary with respect to one another during flash-out. On the other hand, if the photographic film speed is sufficiently high, the PIP medium, the photographic film, or both, may be in motion during flash-out.

It will be noted that the latent image may also be read out according to the methods described in U.S. Pat. No. 2,972,082, by a scanning beam of exciting energy which is synchronized with a display device such as the cathode ray tube of a television set. The variations in electrical potential caused by the beam produced point-by-point depolarization of the PIP medium would then be sensed, amplified as necessary and used to control the television signal, all by conventional techniques. Since the scanning and television sweeps are synchronized, the pattern of potential variation caused by the point-by-point depolarization of the latest image may be sensed and used to produce a television presentation of the latent image. It will be noted further that if this readout technique is employed, there is no requirement that the PIP medium be electroluminescent. The details of this readout technique are provided below in connection with the description of FIG. 5.

while the PIP facsimile system receivers described above are of the type wherein the latent image is impressed in the PIP medium by application of a uniform irradiation field and a varying unidirectional electrical field, it will be noted that the latent image may also be impressed by applying a varying irradiation field and a uniform unidirectional electrical field. In such an embodiment the electrical signal emitted by the facsimile system transmitter is sensed, amplified as necessary, and used by the PIP facsimile system receiver to control the amount of radiation impinging on a depolarized or uniformly polarized PIP medium. The image scanning mechanism of the transmitter and the resultant light beam of the receiver are synchronized so that the image received by the transmitter is reproduced as a latent image in the PIP medium of the receiver. The latent image thus provided may be developed by any of the mechanisms described above; for example as a toned image, a photograph, a transparency or even a television picture.

The PIP facsimile system receivers of the present invention may be adapted to receive electrical signals from either conventional facsimile system transmitters or PIP facsimile system transmitters of the type now to be described. In such a PIP facsimile system transmitter, the image to be reproduced is first converted into a latent image, either by an optical system of the type described in the basic applications or by a scanning system of the type described in U.S. Pat. No. 2,972,082. Once formed the latent image is converted into an electrical signal suitable for transmission to the receiver. Such conversion may be accomplished by tracing the medium with a scanning beam of exciting energy which releases or neutralizes, in whole or part, the internal polarization of the latent image. The variations in electrical potential caused by the point-by-point depolarization of the PIP medium are then transmitted to the receiver either directly, by modulation of a carrier wave or other conventional techniques. Such a conversion of the latent image into an electrical signal may also be accomplished by scanning the PIP medium with a capacitance probe and producing an electrical output responsive to the varying amounts of charge induced in the probe by virtue of the scanned PIP medium areas exhibiting persistent internal polarization.

Figure 5:
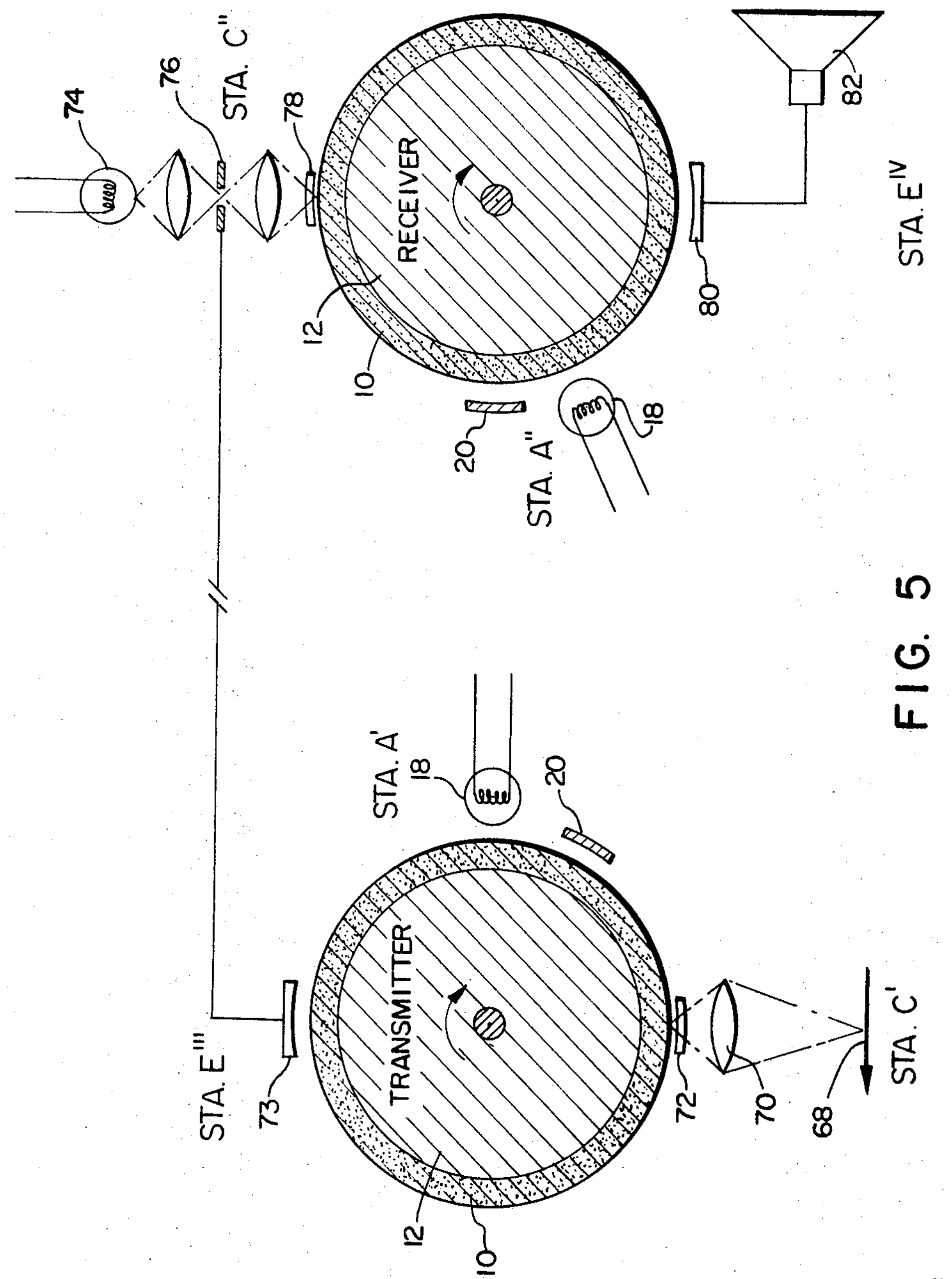
FIG. 5 is a schematic cross-sectional view of a preferred embodiment of a PIP facsimile system transmitter and receiver constructed according to the principles of the present invention.

There is shown in FIG. 5 a preferred embodiment of one of the several PIP facsimile systems of the present invention. In the transmitter shown in the left of the figure, at Station A′ the combination of a uniform irradiation pattern applied by a radiation source 18 and a uniform unidirectional electrical field applied by a conductive member 20 uniformly polarizes the PIP medium 10 on a conductive drum 12. At Station C′ a visible image represented by the arrow 68 is scanned by an optical system 70 and reproduced as a latent image in the PIP medium 10, either as a depolarized image or, if a uniform unidirectional electrical field is applied by the conductive member 72 opposite in polarity to that previously applied by the transmitter's conductive member 20, as a reversely polarized image. At Station E′′′, the latent image is sensed and converted for transmission into electrical signals by means of a capacitive probe 73 adjacent the PIP medium. The variations in persistent internal polarization will induce varying charges on the probe 73 in proportion to the various amounts of polarization in the PIP medium 10. The probe 73 may be connected to a suitable amplifying, modulating and transmitting means as necessary or directly connected to a lead into the receiver.

The transmitted signal is sensed by the receiver, shown at the right of FIG. 5, and may be amplified, demodulated, etc. as necessary. At Station C′′ the corrected signal is then used to modulate the intensity of the radiation passing from a radiation source 74 to the PIP medium 10 of the receiver through a shutter or Kerr cell 76 responsive to the corrected signal. As the PIP medium 10 exposed to this radiation has already been uniformly polarized at Station A′′ by means of the light source 18 and conductive member 20, the radiation of Station C′′ causes a latent image to be formed, either as a depolarized image, or, if the uniform unidirectional electrical field applied by the conductive member 78 is opposite in polarity to that earlier applied by the receiver's conductive member 20, as a reversely polarized image. The latent image is then read out at Station E′ᵛ by means of a scanning of exciting energy beam applied by an electrode 80. The variations in electrical potential caused by the beam-produced point-by-point depolarization of the PIP medium 10 is sensed, amplified as necessary, and used to control the beam of a cathode ray tube 82. As the scanning beam and cathode ray are synchronized, the face of the cathode ray tube presents a visible image or television presentation of the arrow 68.

The electromechanical details of each read-in and read-out step of the facsimile system are old in the art; see, for example, the basic applications and U.S. Pat. No. 2,972,082, although the facsimile system itself is novel.

A common feature of the PIP facsimile system transmitters and receivers is that the latent image may be produced at one speed, from the visible image in one case and the electrical signal in the other, and readout at another speed, as an electrical signal in one case and a visible image in the other. Furthermore, once formed, the latent image may be retained, ready for readout for varying periods of time, depending on the particular PIP medium used. Generally periods in excess of several minutes are feasible and often periods as long as several months. The longevity of the PIP latent image as opposed to the electrostatic image of xerographic machines is believed to result in part at least from the fact that the PIP pattern is within the interior of the imaged body while the electrostatic charges reside only on the exterior surface of the imaged body.

The preferred embodiments of the present invention having been described, other embodiments will readily become apparent to those skilled in the art. Accordingly, it is to be understood that the scope of the present invention is limited only by the true spirit and scope of the appended claims.

I claim:

1. A facsimile system for making visual reproductions of visual images comprising:
   - first and second latent image storage means, each of said storage means comprising a conductive backing and a medium thereon capable of exhibiting persistent internal polarization upon the application of an irradiation field and an electrical field thereto;
   - means for forming in said first storage means first latent image of a visual image, said forming means comprising means for applying a pattern of irradiation and a uniform unidirectional electrical field to said first storage means;
   - means for sensing said first latent image in said first storage means and transmitting a varying electrical signal corresponding to said first latent image;
   - means for receiving said signal and forming in said second storage means a latent image corresponding thereto, said receiving and forming means comprising means for applying irradiation and unidirectional electrical fields to said second storage means and for modulating the magnitude of one of said fields in response to said signal to thereby form a second latent image corresponding to said first latent image, said receiving and forming means being operative to successively sweep said modulated field across the underlying width of said second storage means;
   - means for forming a visual reproduction of said second latent image; and
   - means for transporting said second storage means sequentially past said receiving and forming means and said means for forming a visual reproduction, said transport means being operative to intermittently advance said second storage means to present to said modulated field successive unmodulated widths of said second storage means.

2. The facsimile system of claim 1, wherein: said means for forming a latent image in said first storage means is operable at a different rate than said means for forming a latent image in said second storage means.

3. A facsimile system receiver for producing a visible image from electrical signals transmitted by a facsimile system transmitter, comprising:
   - a latent image storage means, said storage means comprising a medium capable of exhibiting persistent internal polarization upon irradiation and the application of an electrical field thereto;
   - first means for applying an irradiation field and a unidirectional electrical field to said medium and for modulating the magnitude of one of said fields in response to variations in said electrical signals to thereby form a pattern of persistent internal polarization within said medium, said first means being operative to successively sweep said modulated field across the underlying width of said medium;
   - second means for forming a visible image corresponding to said pattern; and
   - means for transporting said storage means sequentially past each of said enumerated means, said transport means being operative to intermittently advance said medium to present to said modulated field successive unmodulated widths of said medium.

4. A facsimile system receiver for producing a visible image from electrical signals transmitted by a facsimile system transmitter, comprising:
   - a latent image storage means, said storage means comprising an electroluminescent medium capable of exhibiting persistent internal polarization upon irradiation and the application of an electrical field thereto;

first means for applying an irradiation field and a unidirectional electrical field to said medium and for modulating the magnitude of one of said fields in response to variations in said electrical signals to thereby form a pattern of persistent internal polarization within said medium;

second means for forming a visible image corresponding to said pattern, said second means comprising means for applying to said medium a unidirectional electrical field opposite in polarity to that applied by said first means; and means for transporting said storage means sequentially past each of said enumerated means.

5. The facsimile system receiver of claim 4, wherein: said second means applies a uniform unidirectional electrical field and operates only intermittently relative to said first means.

6. The facsimile system receiver of claim 4, wherein: said second means further comprises a transparent conductive member substantially parallel to an opposed length of said medium.

7. A facsimile system for making visual reproductions of visual images comprising:

first and second latent image storage means, each of said storage means comprising a conductive backing and a medium thereon capable of exhibiting persistent internal polarization upon the application of an irradiation field and an electrical field thereto;

means for forming in said first storage means first latent image of a visual image, said forming means comprising means for applying a pattern of irradiation and a uniform unidirectional electrical field to said first storage means;

means for sensing said first latent image in said first storage means and transmitting a varying electrical signal corresponding to said first latent image;

means for receiving said signal and forming in said second storage means a latent image corresponding thereto, said receiving and forming means comprising means for applying irradiation and unidirectional electrical fields to said second storage means and for modulating the magnitude of one of said fields in response to said signal to thereby form a second latent image corresponding to said first latent image, said second storage means comprising an electroluminescent medium; and means for forming a visual reproduction of said second latent image including means for applying to said electroluminescent medium a unidirectional electrical field opposite in polarity to that applied by said receiving and forming means.

8. The facsimile system of claim 7, wherein: said means for forming a latent image in said first storage means is operable at a different rate than said means for forming a latent image in said second storage means.